May 31, 1932.  B. C. COOK  1,861,049
BRAKE AND CLUTCH CONTROL FOR MOTOR VEHICLES
Filed Jan. 28, 1931  3 Sheets-Sheet 1
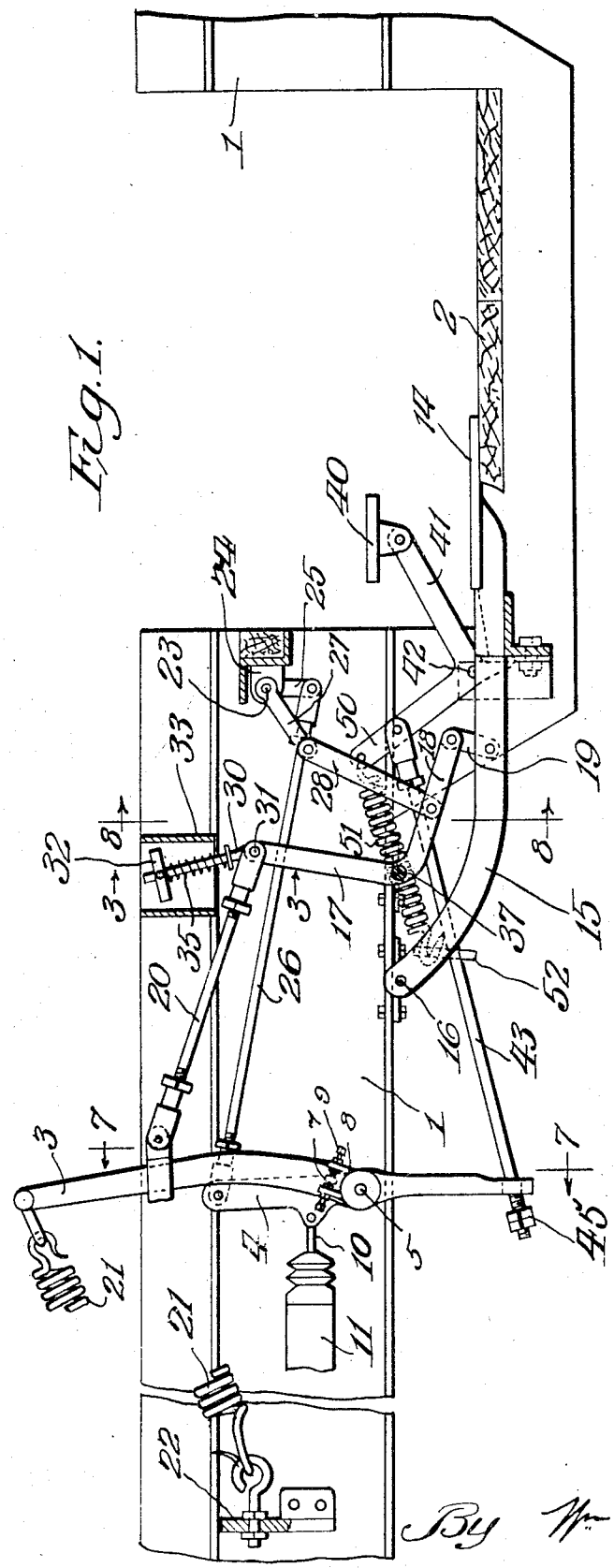
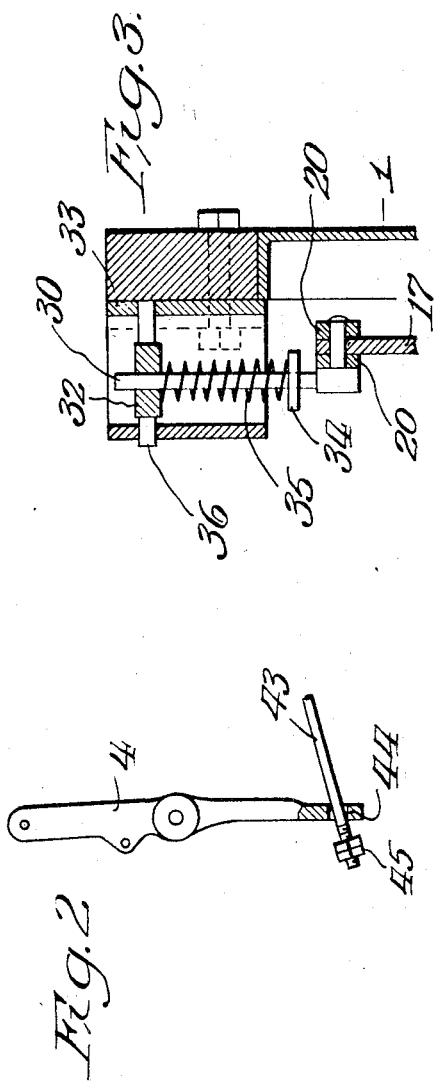
Inventor
B. C. Cook,
By Wm F. Freudenreich, Atty.

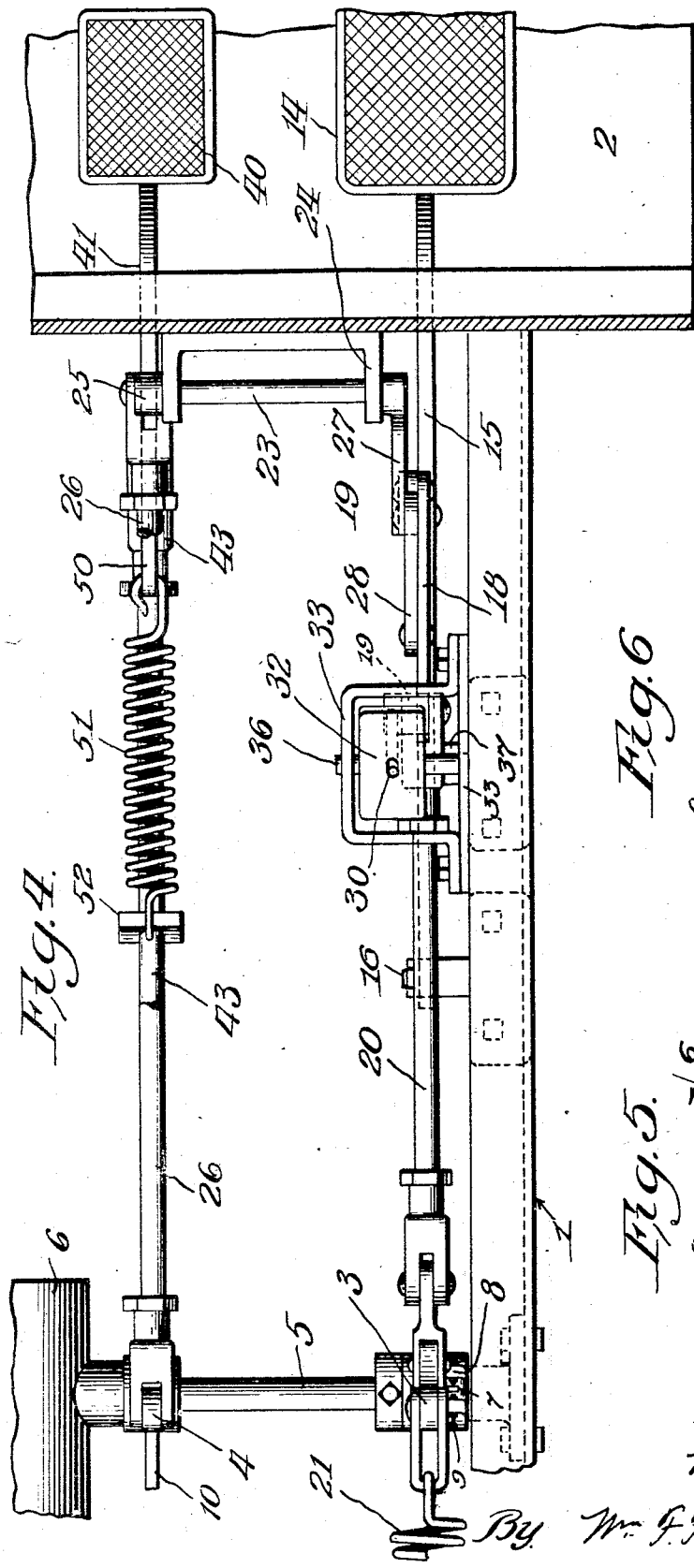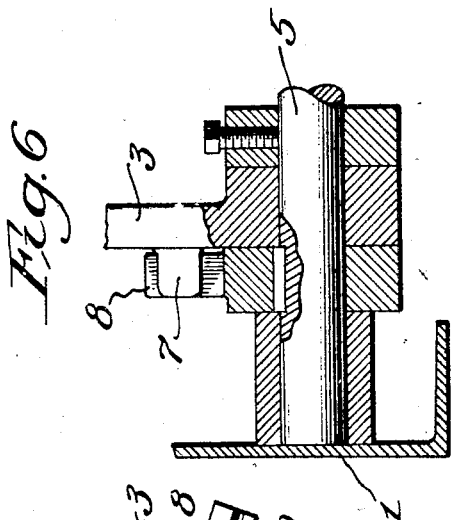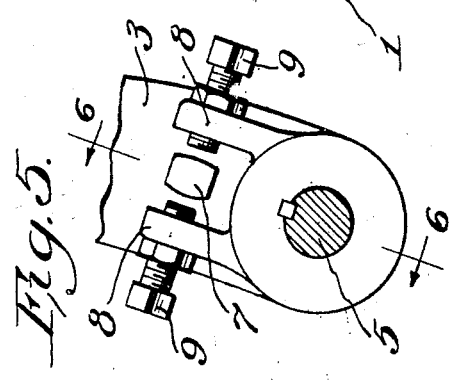

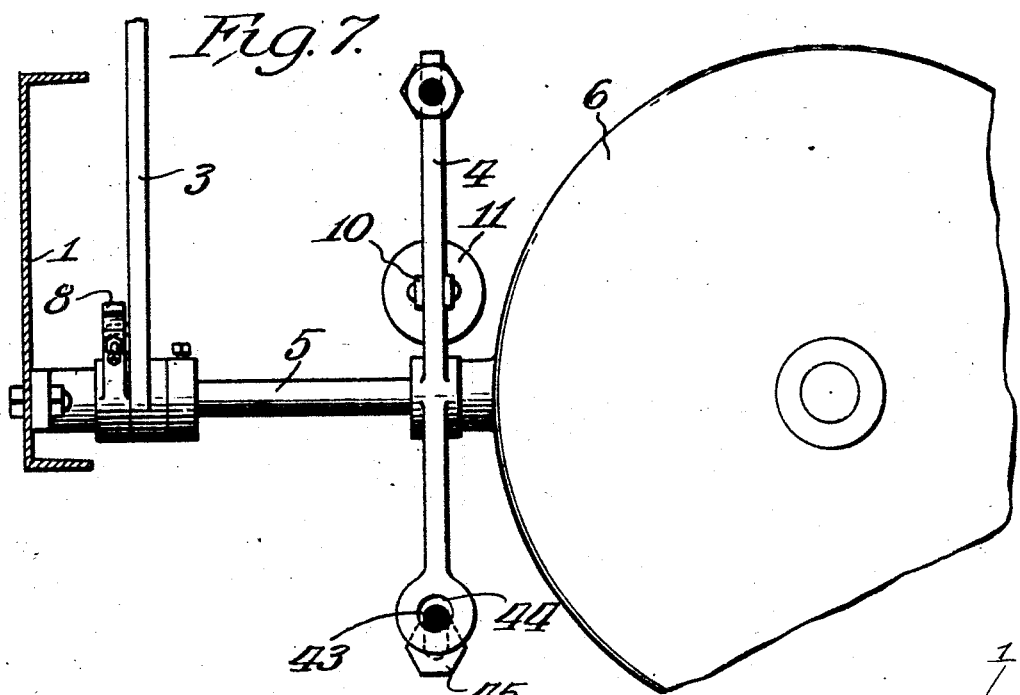
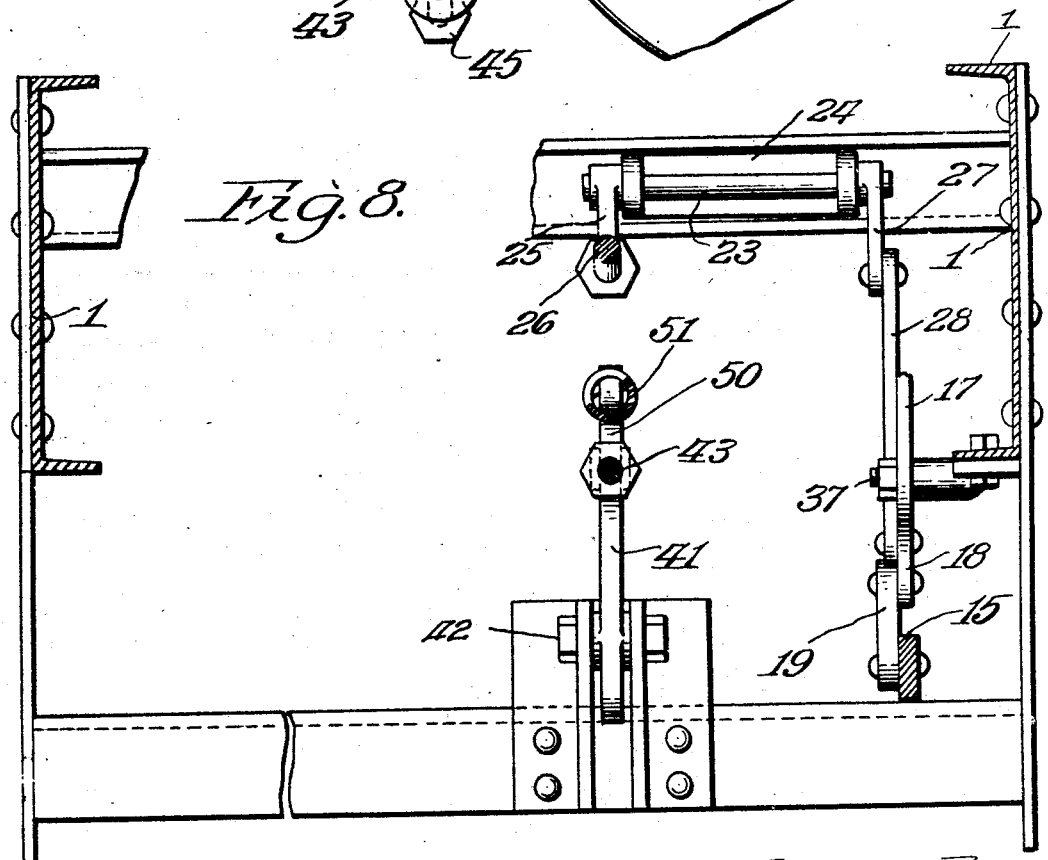

Patented May 31, 1932

1,861,049

UNITED STATES PATENT OFFICE

BERNARD C. COOK, OF DE KALB, ILLINOIS, ASSIGNOR TO DE KALB WAGON COMPANY, A CORPORATION OF ILLINOIS

BRAKE AND CLUTCH CONTROL FOR MOTOR VEHICLES

Application filed January 28, 1931. Serial No. 511,655.

It is advantageous for the drivers of motor vehicles, for example, milk wagons, which must be started and stopped many times in a comparatively short distance of travel, to be able to start the vehicles by the mere act of stepping into the same, without being required to perform other operations to release the brakes and throw in the clutch. The present invention has for its object to produce a simple, novel and efficient mechanism for this purpose whereby the driver, having set his gear shift lever, simply steps out of the vehicle to stop it and simply steps in again to start the vehicle.
In carrying out my invention I interconnect a foot pedal, the brake lever and the clutch lever so that they must all operate together, a strong spring being provided to act on these parts so as normally to hold the foot pedal up, the brake lever in braking position, and the clutch lever in release position. When the driver steps on the pedal, pressing it down against the resistance of the spring, the brakes are released and the clutch is thrown in. When the driver takes his foot from the pedal, the pedal rises, the brakes are applied, and the clutch is released. Thus, assuming the gear shift lever to be in the desired running position, the driver simply steps out of the vehicle to stop it and starts the vehicle again by the act of entering it.

I prefer to place the pedal in such a position that it will be beneath the left foot of the driver. And, since the natural impulse of a driver is to press down with his right foot to apply a brake, I provide a second foot pedal interconnected with the other or main pedal and the controlling mechanism; the movements of the two pedals being in effect opposite to each other, one being up when the other is down. During normal driving the main pedal is held down and the second pedal is up. In case the driver wishes to make a quick stop, he can follow the natural impulse to press a brake pedal with his right foot and step on the second pedal. In stepping on the second pedal the driver shifts his weight from the left to the right foot, and, therefore, the second pedal moves down and the main pedal rises. The second pedal has a further use in that it will serve as an ordinary brake pedal in case the spring breaks or weakens so as no longer to be effective to apply the brakes.

The connection between the second pedal and the other mechanism may, and preferably does, contain a lost motion that will permit this pedal to remain in its raised position during normal control of the brake through the spring and the main pedal.

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figure 1 is a longitudinal section through a vehicle body, showing my improvements in elevation, only so much of the vehicle structure being shown as is needed to make clear the positions thereon of the various parts of my improvement; Fig. 2 is a side view of the brake-controlling lever and the corresponding end of the connecting rod between the same and one of the pedals, a fragment of the lever being broken away; Fig. 3 is a section taken approximately on line 3—3 of Fig. 1, on a larger scale; Fig. 4 is a top plan view, on a larger scale, of the mechanism shown in Fig. 1, as well as of portions of the vehicle body; Fig. 5 is a section taken at right angles to the clutch-operating shaft adjacent to the clutch-controlling lever, a fragment of which is shown, on a still larger scale; Fig. 6 is a section on line 6—6 of Fig. 5, showing also a fragment of the vehicle frame; Fig. 7 is a section, on a larger scale, taken approximately on line 7—7 of Fig. 1; and Fig. 8 is a section on the same scale as Fig. 7, on line 8—8 of Fig. 1.

Referring to the drawings, 1 represents a part of the chassis frame of a vehicle having a depressed floor 2 on which the driver stands. 3 is the clutch lever and 4 the brake lever which may be of any usual or suitable construction and form part of any usual or suitable power plant for a motor vehicle. In the arrangement shown, these two levers are supported by and rotatable on the clutch-operating shaft 5 extending into a clutch housing or casing 6. As best shown in Figs. 5 and 6, the clutch lever is illustrated as having thereon, at a point near the shaft, a lug 7 that projects from one side between two separated stops fixed to the clutch shaft; these stops being shown as taking the form of two separated arms or fingers 8, 8, each having therein a set screw 9, one of which is adapted to engage with one side of the lug and the other with the opposite side. The brake lever is shown as being connected to the piston rod 10 of a hydraulic brake mechanism of which the cylinder 11 is shown.

The main foot pedal 14 is on the rear end of a long arm 15 hung at its forward end, as indicated at 16, from the main frame. Above the forward end of the member 15 is a bell crank lever one of whose arms 17 extends in the upward direction and the other arm 18 of which extends more or less horizontally in the rearward direction. A short link 19 connects the free end of the arm 18 to the member 15. A connecting rod 20 connects the clutch lever with the upper end of the arm 17. A strong tension spring 21 is connected at one end to the upper end of the clutch lever and at its other end to a bracket or other part 22 fixed to the frame forwardly of the lever. Normally, the spring draws the upper end of the clutch lever forward, thus rocking the bell crank lever and raising the pedal 14 above the floor, the clutch being now released and remaining so until the driver steps on the pedal and presses it down again, as shown in Fig. 1.

In order that the brake will be applied whenever the clutch is released, I provide the following mechanism: Just in front of the space in which the driver stands and at about a level with the top of the chassis frame is a transverse rock shaft 23 supported by a suitable stationary bracket 24. An arm 25, fixed to the rock shaft, extends downwardly therefrom, and, connected at its ends to the lower end of this arm and to the upper end of the brake lever, respectively, is a connecting rod 26. A second rocker arm 27 extends forwardly and downwardly from the rock shaft. A link 28 connects the free end of the arm 27 to the arm 18 of the bell crank lever about midway between the ends of the latter. Therefore, whenever the spring draws the upper end of the clutch lever forward, causing the arm 18 of the bell crank lever to rise, the link or strut 28 turns the rock shaft 23 in a direction to force the connecting rod 26 in the forward direction and thus push the upper end of the brake lever forward. When the pedal is depressed, the reverse action takes place, the rock shaft being caused to turn in the counter-clockwise direction, as viewed in Fig. 1, thus drawing the brake lever backward into its release position.

Since the spring 21 must be strong enough to insure a good application of the brakes, as well as hold the clutch in, considerable resistance is encountered in holding the pedal down. I have, therefore, provided a snapover device employing a compression spring which, when the pedal is down, assists in holding it down, and, when the pedal is up, assists in holding it up. This device may consist of a rod 30 connected at one end to the arm 17 of the bell crank lever and the connecting rod 20 by the pin 31 that fastens these last two elements together; this rod extending upwardly through a plate 32 supported by a suitable clamp or bracket 33 on the frame so as to be capable of rocking about a transverse axis; the rod having thereon, near its lower end, a collar 34; and there being a compression spring 35 between the collar and the plate 32. The parts are so proportioned and positioned that, when the pedal is down, as shown in Fig. 1, the spring 35 acts on the bell crank lever in a direction to hold the pedal in that position. When the driver takes his foot off the pedal and the main spring 21 draws the upper end of the clutch lever forward, the pivot pin 31 passes to the opposite side of the plane connecting the axes of the journals 36 of the plate 32 and of the pivot pin 37 for the bell crank lever so that the pressure of the spring 35 acts in a direction to swing the bell crank lever in the counter-clockwise direction, as viewed in Fig. 1; thus in assisting in holding the pedal in its raised position. The spring 35 is, of course, weak enough so that it will not prevent the main spring from quickly applying the brakes when the driver takes his foot from the main pedal.

An auxiliary pedal 40 is placed beside the main pedal in such a position that it may readily be pressed down by the right foot of the driver. This auxiliary pedal is carried on one end of an angle lever 41 pivoted at its end to the frame work, as indicated at 42. A connecting rod 43 extends from the forward portion of the angle lever to a downward extension of the brake lever. This connecting rod is preferably connected to the brake lever in such a manner as to provide a lost motion. In the arrangement shown, the connecting rod passes loosely through a hole 44 in the brake lever and has thereon, beyond the lever, a nut 45 or other shoulder device. When the brake and clutch levers are actuated by the main spring, or by the main pedal, the lower end of the brake lever simply slides back and forth along the rod 43, so that the auxiliary pedal may remain constantly in its elevated position. However, when the auxiliary pedal is pressed down, the shoulder on the connecting rod 43 engages with the front side of the lower end of the brake lever, so that the brake lever must then move with the connecting rod during the remainder of the descent of the auxiliary pedal; this movement of the brake lever being sufficient to apply the brakes. Furthermore, since the brake lever and the clutch lever are interconnected, the clutch lever moves simultaneously with the brake lever so as to release the clutch.

In the arrangement shown, one arm of the angle lever 41 is extended upwardly beyond the point of connection between the lever and the rod 43, as indicated at 50, and a tension spring 51 is connected at one end to the free end of this extension and at its other end to an anchor 52 on the rod 43. By this means the angle lever and the rod 43 are normally held in predetermined angular relation to each other, the spring yielding, however, when the pedal 40 is depressed.

While I have illustrated and described with particularity only a single preferred form of my invention, I do not desire to be limited to the exact structural details thus illustrated and described; but intend to cover all forms and arrangements which come within the definitions of my invention constituting the appended claims.

I claim:

1. In a motor vehicle, having a brake device and a clutch, mechanism including a foot pedal and parts connected thereto to release the brakes and throw in the clutch when the pedal is down and to set the brakes and release the clutch when the pedal is up, a spring acting on said mechanism and tending constantly to set it in motion to raise the pedal and thus apply the brakes and release the clutch, a second pedal, and a connection between the second pedal and said mechanism to cause the latter to be operated to raise the first pedal and apply the brake and release the clutch when the second pedal is depressed.

2. The combination with the brake-operating lever and the clutch-operating lever of a motor vehicle, of a spring connected to the clutch-operating lever tending constantly to move it into clutch-releasing position, a pedal, and mechanical connections between said pedal and said levers to cause the pedal to be raised and the brake lever to be shifted to its braking position when the clutch lever is brought to its release position and to cause the brake lever to be moved into its release position and the clutch lever into its clutch-applying position when the pedal is depressed.

3. The combination with the brake-operating lever and the clutch-operating lever of a motor vehicle, of two pedals, and connections between the levers and pedals causing the brake to be applied and the clutch to be released when one of the pedals is depressed and the brakes to be released and the clutch to be applied when the other pedal is depressed.

4. The combination with a brake-operating lever and a clutch-operating lever of a motor vehicle, a rock shaft and a bell crank lever mounted on the vehicle frame, a connecting rod between the brake lever and the rock shaft, a connecting rod between the clutch lever and one arm of the bell crank lever, a member connecting the other arm of the bell crank lever to the rock shaft, a foot pedal, a connection between the pedal and one arm of the bell crank lever, and a spring acting on one of the aforesaid elements and tending constantly to operate the brake lever and the clutch lever in a direction to apply the brake and release the clutch.

5. The combination with a brake-operating lever and a clutch-operating lever of a motor vehicle, a rock shaft and a bell crank lever mounted on the vehicle frame, a connecting rod between the brake lever and the rock shaft, a connecting rod between the clutch lever and one arm of the bell crank lever, a member connecting the other arm of the bell crank lever to the rock shaft, a foot pedal, a connection between the pedal and one arm of the bell crank lever, a spring acting on one of the aforesaid elements and tending constantly to operate the brake lever and the clutch lever in a direction to apply the brake and release the clutch, a second foot pedal, and a means connecting said second pedal and the brake lever to hold the second pedal raised when the brake lever is in its release position and cause the brake lever to be shifted and the brakes applied when the second pedal is depressed.

6. The combination with the brake-operating lever member and the clutch-operating lever member of a motor vehicle of a pedal member, a mechanical connection between said members to cause the brake lever member to be in braking position and the clutch lever member in release position when the pedal member is raised and the brake lever member to be in brake release position and the clutch lever member in clutch-applying position when the pedal member is depressed, and a spring acting on one of said members normally to hold the pedal member raised.

7. The combination with the brake-operating element and the clutch-operating element of a motor vehicle, of a pedal element, mechanical connecting elements between aforesaid elements to cause the brake to be applied and the clutch to be released, when the pedal element is raised and cause the brake to be released and the clutch to be thrown in when the pedal element is depressed, and a spring acting on one of said elements normally to hold the pedal element raised.

In testimony whereof, I sign this specification.

BERNARD C. COOK.